April 18, 1939. C. E. HENRIOD 2,155,132
AUTOMATIC CHANGE SPEED GEAR
Filed Sept. 5, 1936 4 Sheets-Sheet 1

Inventor
CHARLES E. HENRIOD

By Bailey & Pierson
Attorneys

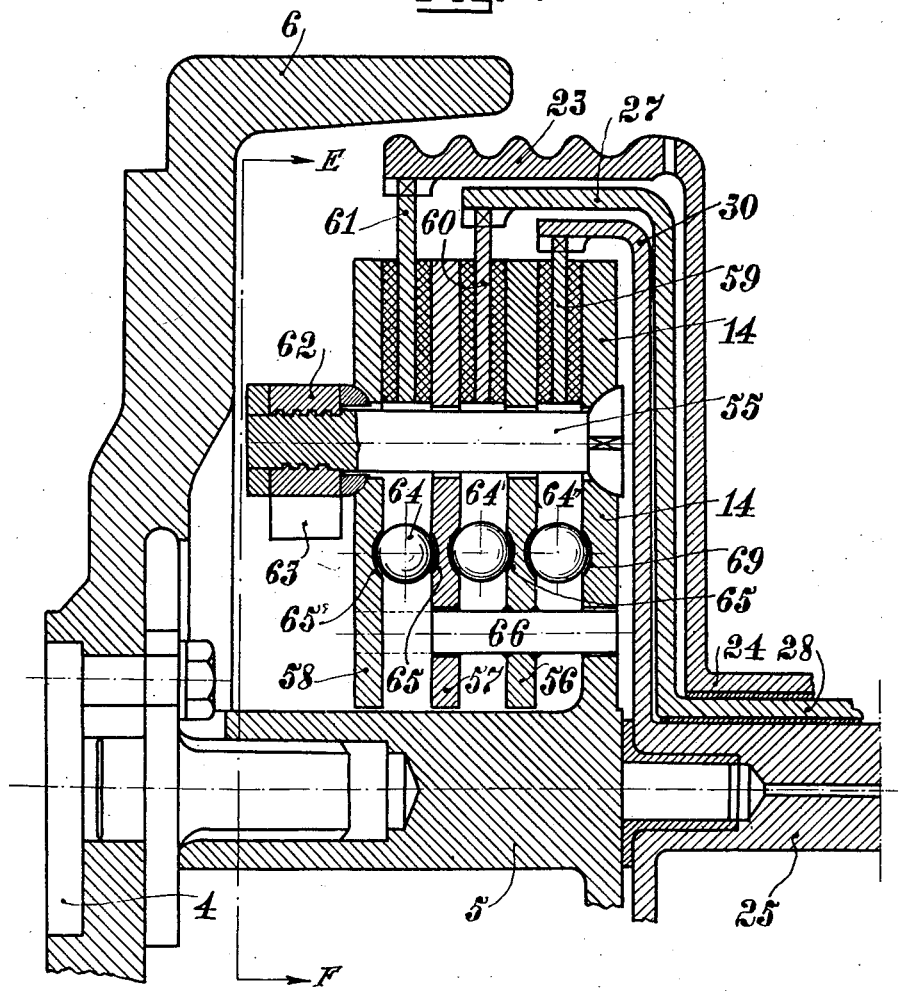

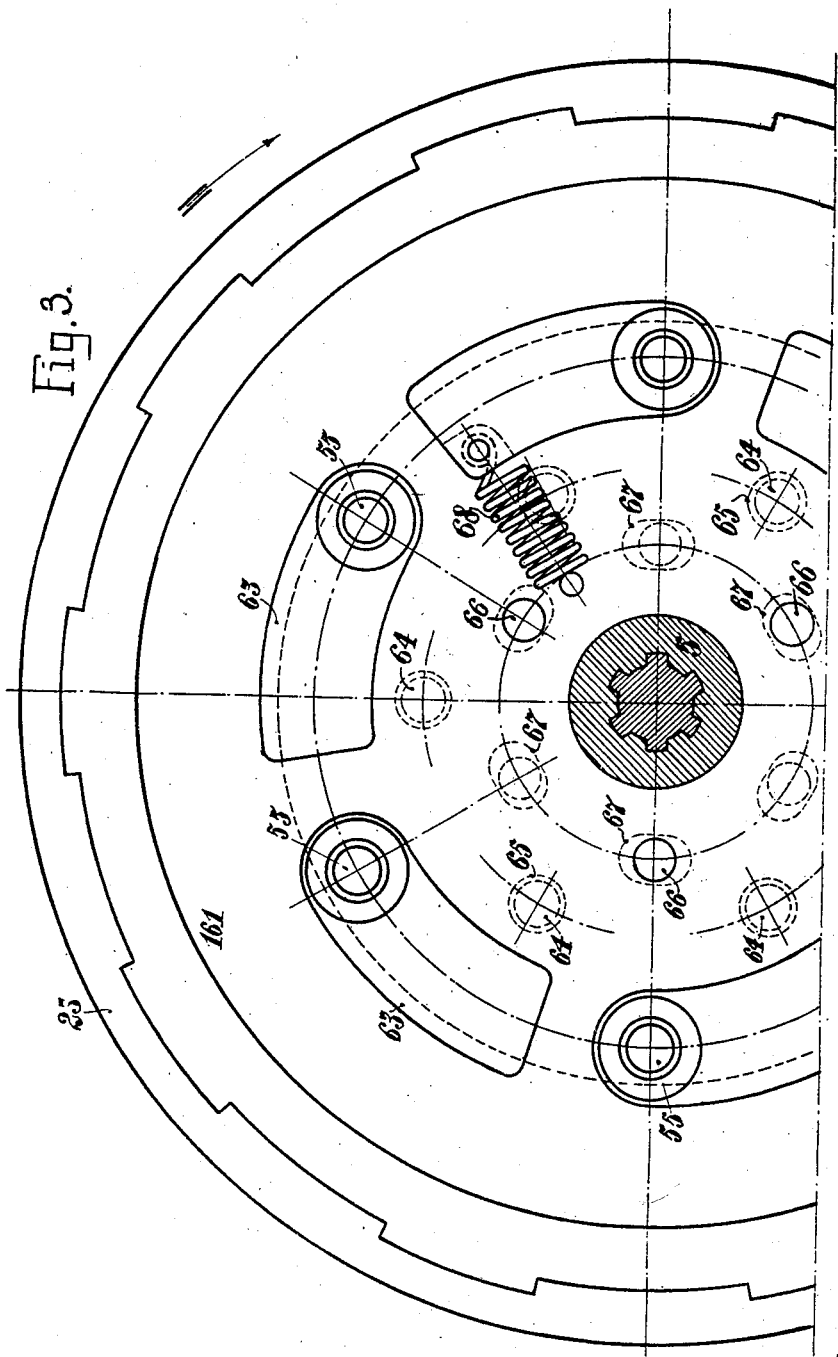

April 18, 1939.  C. E. HENRIOD  2,155,132
AUTOMATIC CHANGE SPEED GEAR
Filed Sept. 5, 1936   4 Sheets-Sheet 4
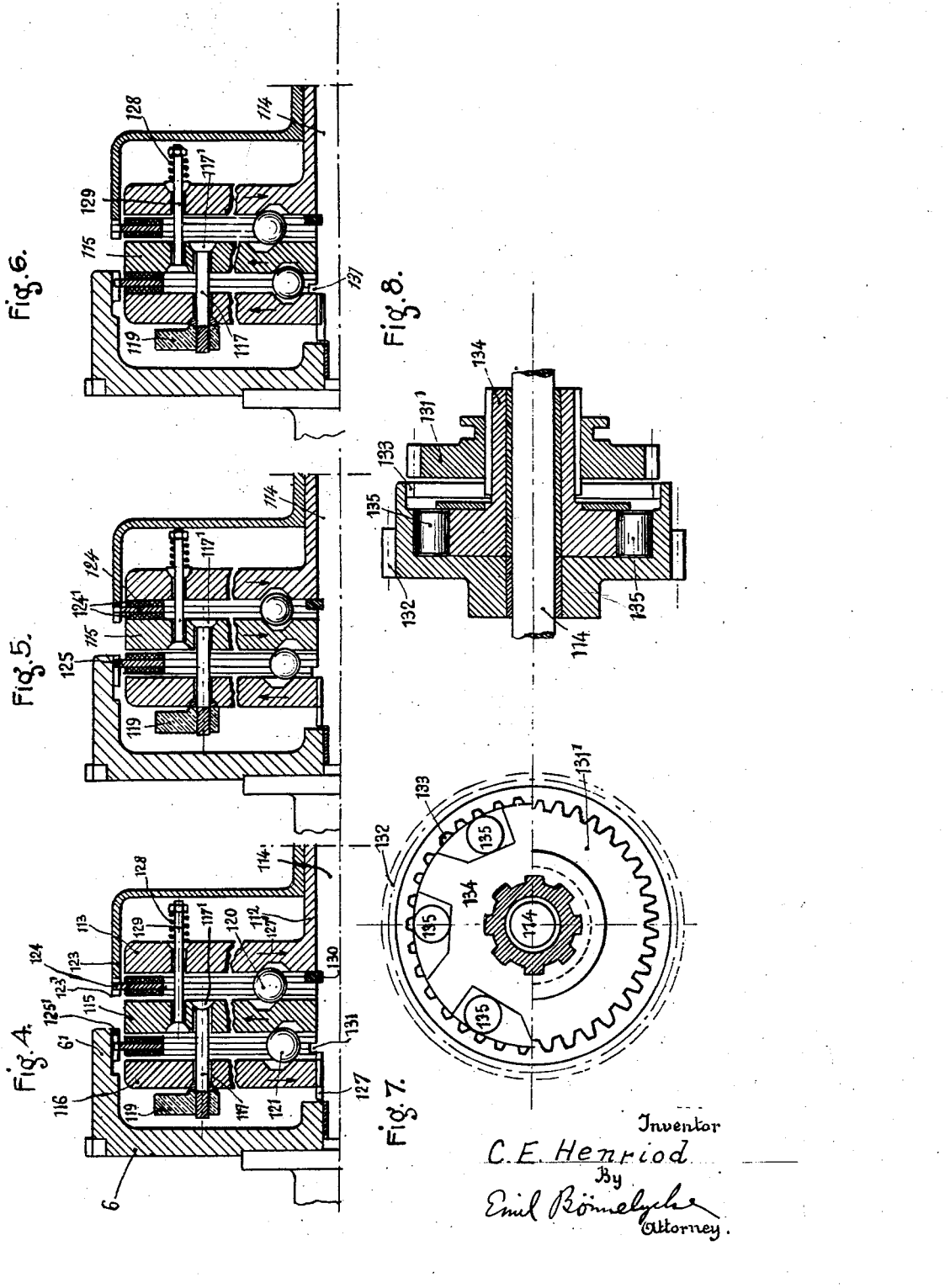
Inventor
C. E. Henriod
By
Emil Bönnelyche
Attorney.

Patented Apr. 18, 1939

2,155,132

UNITED STATES PATENT OFFICE 2,155,132

AUTOMATIC CHANGE SPEED GEAR

Charles Edouard Henriod, Areuse, Switzerland

Application September 5, 1936, Serial No. 99,656
In France December 20, 1935

14 Claims. (Cl. 74—336)

The present invention has for its subject matter the construction of an automatic change speed gear, essentially characterised in that it comprises centrifugal clutches which come into action automatically and successively, as a function of the speed and of the torque. These clutches are combined with means enabling the instant at which they are engaged to be varied automatically as a function of the speed and of the resisting couple or as a function of these two factors together.

In a modification of the above device the clutches are of the plate type and comprise discs driven by balls which are tightened against a cheek secured to the driving portion by means of bolts which pass through all the discs right across; the nuts of these bolts are screwed up or unscrewed by the action of the centrifugal masses to which they are secured.

In these two latter devices the driving balls interposed between the plates also serve as means for varying the instant at which the clutches are engaged as a function of the torque and of the speed, or of both.

The invention also covers modifications in which the coupling device is mounted on the resistance.

The invention also relates to various arrangements of which the particular details will appear in the course of the description.

The accompanying drawings show, by way of example, various forms of construction of the device according to the invention.

Fig. 2 is a view in section of the clutch portion of a modified form.

Fig. 3 is a view in section on the line E—F of Fig. 2.

Figs. 4, 5 and 6 show a modification of Fig. 1 in three positions of operation.

Fig. 7 is an end view of a free wheel locking device, of which

Fig. 8 is a cross section.

Figure 1:
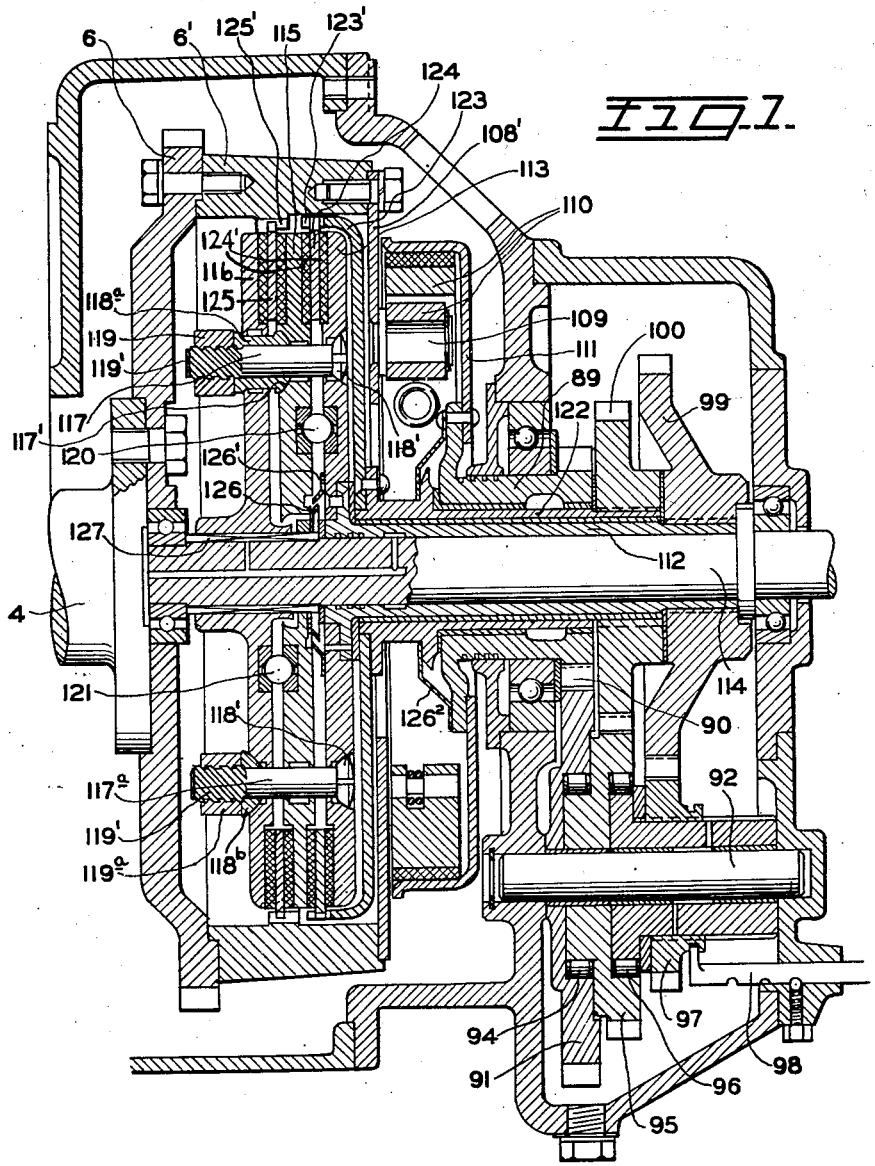
Fig. 1 is a view in longitudinal section of one of these methods of construction, comprising three speeds.

In the form of the invention shown in Fig. 1, the driving shaft is indicated at 4 and the driven shaft at 114. Rigidly mounted on the driving shaft is a plate 6, to which is fixedly secured a drum $6^1$ which in turn carries fixed thereto a plate $108^1$. Pivoted on the plate $108^1$ at 109 are clutch shoes 113 engageable with a clutch drum 111 secured to a sleeve 89, which is the outermost of three sleeves mounted on the driven shaft 114.

The inner sleeve 112 has secured thereto at its left end a plate 113 having at $124^1$ a surface of frictional material, forming a portion of a clutch. To the left of the disc 113 is another disc 115, having a friction surface $124^1$ opposed to the friction surface on the disc 113. A third disc 116 is keyed to the driven shaft 114, and the adjacent faces of clutches 116 and 115 are provided with frictional surfaces.

Between the frictional surfaces on the plates 115 and 116 is arranged a ring 125 which is connected by teeth at $125^1$ to the drum $6^1$ for rotation therewith. Between the friction surfaces $124^1$ is a plate 124 which is keyed by teeth at $123^1$ to a plate 123 rigid on intermediate sleeve 122.

Between the plates 113, 115 and 116 are arranged two sets of balls 120 and 121. These balls move in grooves having inclined bottoms in the opposite faces of the plates.

Passing through the three discs are pins 117' and $117^a$. These pins have heads $118^1$ seated in spherical depressions in the right hand faces of disc 113. Mounted on pin 117 is a member $118^a$ having a spherical end resting on a spherical seat $117^1$ in the left hand side of disc 115. On the outer end of pin 117 are threads $119^1$ of high pitch, on which is threadedly engaged a nut 119 having a weight at one side thereof, as shown more clearly in Fig. 3.

Pin $117^a$ carries slidably thereon a pressure member $118^b$, which engages in a spherical seat in the left hand face of plate 116. Nut $119^a$ engaging threads $119^1$ is also actuated by an eccentrically arranged weight rigid therewith.

Members 126, $126^1$ and $126^2$ are splash rings for preventing oil from the shaft and sleeves passing to the clutch surfaces.

Mounted on the rear or right hand end of sleeve 89 is a gear 90 meshing with a gear 91 carried by a countershaft 92. This gear through a free wheel 94 is capable of driving a gear 95, which also meshes with a gear 100 mounted on sleeve 122. Gear 95 through free wheel 96 is capable of driving gear 97, which also meshes with gear 99 rigid on sleeve 112.

Gear 97 is slidable, and may be moved to three different positions by rod 98. In one position, representing neutral, it is out of engagement with any gears, while in the third position it may be engaged with a reverse idler gear (not shown). In the position shown in Fig. 1, gear 97 is in forward driving position.

The operation of this device is as follows:

Shaft 4 through drum $6^1$ drives plate $108^1$, the clutches formed by plates 124 and 125, and by shoes 110, being disengaged. At the time the device runs idle, and no power is transmitted. When a sufficient speed is reached, the centrifugal clutches 110 are pressed outwardly into engagement with the drum 111, and thus drum 111 and sleeve 89 are rotated. Gear 90 drives gear 91, gear 95, gear 97 and gear 99 and thereby turns sleeve 112. Balls 120 and 121, although in a position, as will be explained below, to space the discs 113, 115 and 116 apart, nevertheless transmit motion from one of these discs to the next one and thereby drive disc 116, which in turn drives shaft 114.

In this low speed drive, the torque on the driven shaft is high and therefore the discs 113, 115 and 116 tend to turn with respect to each other. In this turning movement, balls 120 and 121 are shifted into the shallow portions of the groove in which they run, and thus push discs 113, 115 and 116 apart so that clutch plates 124 and 125 are not engaged.

As the speed increases and the torque decreases, nuts 119 are tightened and balls 120 move into the deeper portions of their grooves. As a result, follower 118ª pushes disc 115 towards disc 113, thereby pressing friction surfaces 124¹ against plate 124 and locking this plate to the two discs. When this occurs, gear 95, still driven in the same manner as described above, through gear 100, drives sleeve 122 to turn disc 123 and therewith turns discs 113 and 115, at a higher speed than when clutch 124 is disengaged. Balls 121 transmit this motion to plate 116 and thereby to the driven shaft 114. During this drive wheel 95 moves faster than wheel 97, but this is permitted by the free wheel 96.

For a third speed, or direct drive, the speed must increase still more and the torque decrease. At a certain speed, and reduced torque, balls 121 move into the deeper portions of their grooves and nut 119ª forces plate 116 towards plate 115 so as to clutch plate 125 therebetween. This clutches plate 116 to drum 61, so that a direct drive is obtained between shafts 4 and 114.

There will now be described the modification in Figs. 2 and 3. In this modification also there are used plate clutches. These clutches are constructed in the following manner.

The intermediate shaft 5 is secured to a plate 14 on which are secured bolts 55 passing freely through three plates 56, 57, 58 between which are tightened rings 59, 60 and 61, respectively secured to clutch drums 30, 27 and 23. These members are held assembled by means of nuts 62 screwed on the bolts 55 and each provided with a centrifugal mass 63. Between the plates 14, 56, 57 and 58 are interposed balls 64, 64¹ and 64² located in recesses 65 of corresponding shape. These balls serve to set in rotation the clutch plates relatively to one another, a stop 66, secured to the plate 56 and moving in slots 67, limiting their movement. Each of the centrifugal masses 63 is provided with a return spring 68.

The operation is the following:
The engine being in operation all the clutches are driven disengaged, as in the case of the device in Figs. 1 and 2. When the engine reaches the speed of 1000 revolutions the masses 63 secured to the tightening nuts 62 spread apart by reason of the centrifugal force and tighten the clutch plates against the driving rings 59, 60 and 61.

The resistance to starting being too high for driving the three clutches, the driving balls 64¹ and 64² of the second and third speeds, do not resist the drive and tend to leave their recesses by spreading the plates 56 and 57 of the rings 59 and 60 and by increasing the tightening of the flange 61 against the plates 57 and 58. This flange thus drives, through the medium of its drum 23, the hub 24 which carries the gear of the first speed.

The second speed is obtained by the action of the reduction of resistance itself. For this purpose the balls 64¹ enter their recess and the flange 60 is tightened against the plates 57 and 56 thus driving its drum 27 of which the hub 28 carries the gear for the second speed.

The third speed, that is to say direct drive, is obtained as for the second speed. When the resistance diminishes the balls 64² enter their recesses and the two plates 14 and 56 tighten on the ring 59 by reason of the tightening force of the centrifugal masses 63.

The modification shown in Figs. 4, 5 and 6 comprises the following improvements: while in Fig. 1, in high gear, all the clutches are simultaneously connected, which necessitates the provision of free wheels in the box, in the above mentioned figures the clutches for the second gear and for the high gear cannot be connected together.

The same references designate the same elements as in Fig. 1. The driving clutch of the first gear has not been shown and is similar to the clutch of Fig. 1.

The operation is as follows:
Fig. 4 shows the position of the elements in first gear. As before, the movement and the driving force pass through the sleeve 112, the plate 113, the balls 120, the plate 115, the balls 121, the plate 116, this latter being slidingly keyed on the shaft 114 at 127. The direction of the forces is indicated by the arrows 127¹.

Of course, the plates are shifted when rotating. For a better comprehension they have been shown shifted in the drawings.

A fixed tension spring 128 tends to cause the tightening of the plates 113 and 115 through the ball rod 129.

A series of centrifugal masses 119 tends to tighten the plates 115 and 116 through the rod 117.

The shifting the plates when rotating is limited through stops which are not shown. In first gear this shifting has its full extension and causes the disengagement of the second and third gears by means of the balls.

The balls 121 are on a greater radius than the balls 120; thus they are subjected to a greater tangential stress.

The stop 130 maintains the plate 113 and the sleeve 112 laterally. The speed of the shaft 114 increases always in first gear; the resisting torque diminishes, the centrifugal tightening up of the masses 119 increases, but the disengagement torque on the balls 121 remains stronger. For a determined value of the stress on the balls 120, the traction of the spring 128 predominates and the second gear disc 124 is tightened. The position is then the same as in Fig. 5 and the unit formed of both plates 115 and 116 has been shifted towards the right for following the shifting movement of the plate 115.

The speed of the shaft 114 still increases and the resisting torque continues to diminish till the tightening of the masses 119 is greater than the tension of the spring 128 and the disengagement stress of the balls 121. Then the plate 115 is shifted towards the left, thus setting the second gear free for clutching on the third gear; the position is then the same is in Fig. 6. It is to be noted that for effecting the traction of the plate 115 the plate 116 has come to rest against a stop 131.

In the position of Fig. 6, if the resisting torque increases, the pieces return to the position of Fig. 4 through the same functions, but in the converse direction.

If the car drives the engine, the mechanism will remain clutched in high gear till the spring 128 returns the plate 115 for positively establishing the second gear.

For facilitating the judicious establishment of the points for the change from second to third gear and conversely, the tightening curve for the masses 119 can be changed by adding to the same a constant tightening effect in the form of springs having a fixed value.

In practice the spring 128 may be located on the left hand side of the plate 115 for reducing the place which is required.

It has been said that such a change speed gear only requires a simple free wheel for the first gear. It is easy to render the first gear positive at will by locking its free wheel according to the device shown in Figs. 7 and 8. 114 is the shaft, 131¹ is the sliding pinion giving the neutral position, the forward drive and the reverse by means of a suitable control. 132 is the second gear pinion, carrying internal teeth 133 corresponding to the pinion 131¹. 134 is the hub of the free wheel on which the sliding pinion 131¹ is splined and slides. 135 are the free wheel rolls.

The drawings show the pinion 131¹ in the position for automatic forward drive. If it is shifted towards the left till it engages the teeth 133, the free wheel is locked and the positive first gear is obtained.

It will be understood that the forms of construction above described are simply given by way of example and may receive any desirable constructional modifications without departing from the scope of the invention for this purpose. Thus for example, one or other of the devices may be mounted on the resisting shaft instead of being mounted on the driving shaft.

I claim:

1. A variable speed transmission comprising a driving member, a driven member, a plurality of speed combinations, a separate clutch for each speed combination, and automatic means controlled by the speed of the driving member and the load on the driven member to control said clutches, said means including centrifugal masses adapted to cause engagement of said clutches when a certain speed is reached, and means connecting said clutches, said clutch connecting means transmitting the load on the driven member to the various clutches, said clutch connecting means including members movable upon variations in the load on the driven member for preventing engagement of one of the clutches as long as the load remains above a predetermined value.

2. A variable speed transmission comprising a driving member and a driven member, a plurality of speed combinations for connecting said driving and driven members, a clutching mechanism for each speed combination, means including a clutch member secured on the driven member for imparting movement thereto at all speed combinations, means controlled by the speed of one of said members for producing engagement of said clutching mechanisms comprising centrifugally movable masses, and means controlled by the load on the driven member for preventing engagement of one of said clutching mechanisms as long as the load on the driven member exceeds a predetermined value.

3. A variable speed transmission comprising a driving member, a driven member, a plurality of speed combinations, separate clutching means for each speed combination, means including a clutch member secured on the driven member for imparting movement thereto at all speed combinations, automatic means controlled by the speed of the driving member and the load on the driven member to control said clutching means, said automatic means including centrifugal masses adapted to cause engagement of said clutching means, means to drive said centrifugal masses in accordance with the speed of one of said members, means to transmit to a portion of each of said clutching means the load on said driven member, and means movable upon variations in the load on the driven member for preventing engagement of one of said clutches as long as the load remains above a predetermined value.

4. In a device as claimed in claim 3, said clutching means including plates and said movable means comprising balls arranged between said plates.

5. In a device as claimed in claim 3, said clutching means including three substantially parallel plates, cooperating clutch members on said plates, said plates having opposed recesses therein and said movable means comprising balls engaged in said recesses.

6. In a device as claimed in claim 3, said clutching means including three substantially parallel plates, cooperating clutch members on said plates, said plates having a plurality of pairs of opposed recesses therein and said movable means comprising balls engaged in said recesses, one pair of recesses being closer to the axis of rotation than another pair.

7. In a device as claimed in claim 3, said clutching means including discs mounted on one of said members, pins running through said discs, said centrifugal masses being threaded on said pins so as to press said discs together under the action of centrifugal force.

8. In a device as claimed in claim 3, said clutching means including discs mounted on one of said members, pins running through said discs, said centrifugal masses being threaded on said pins so as to press said discs together under the action of centrifugal force, said discs having opposed recesses therein and said movable means including balls located in said recesses.

9. In a device as claimed in claim 3, said clutching means including discs mounted on one of said members, pins running through said discs, said centrifugal masses being threaded on said pins so as to press said discs together under the action of centrifugal force, said discs having opposed recesses therein and said movable means including balls located in said recesses, the recesses in one pair of plates being further from the axis of rotation than the recesses in the other pair.

10. In a device as claimed in claim 3, said clutching means comprising at least three discs mounted on said members, pins running through said discs, said centrifugal masses being threaded on said pins so as to press said discs together under the action of centrifugal force, means on some of said pins engaged to some of said discs to urge them together, and means on other pins engaging one of said first two discs and the third disc to urge them together.

11. In a device as claimed in claim 3, said clutching means including at least three discs mounted on said members, a pin passing through two of said discs, a centrifugal mass threaded on said pin and adapted to press said discs together, a pin passing through one of said first two discs and the third disc, and a spring on said pin urging said last two discs together.

12. In a device as claimed in claim 3, springs resisting outward movement of said centrifugal masses.

13. A variable speed transmission comprising a driving shaft, a driven shaft, sleeves mounted on said driven shaft, gears fixed on said sleeves, a countershaft, gears on said countershaft meshing with said first gears, free wheel means connecting said second gears, a plurality of clutches having parts connected to said sleeves and parts connected to the driving and driven shafts, a clutch being provided for each speed, and automatic means controlled by the speed of the driving shaft and the load on the driven shaft to control said clutches, said automatic means including centrifugal masses adapted to cause engagement of said clutches when a certain speed is reached, and means connecting said clutches, said clutch connecting means transmitting the load on the driven shaft to the various clutches, said clutch connecting means including members movable upon variations in the load on the driven member for preventing engagement of one of the clutches as long as the load remains above a predetermined value.

14. A variable speed transmission comprising a driving shaft, a driven shaft, a countershaft opposite said driven shaft, three sleeves mounted on said driven shaft, gears on said sleeves, gears on said countershaft meshing with said first gears, free wheel mechanisms connecting said gears on said countershaft, a member secured to the driving shaft, centrifugal clutch mechanism having a part mounted on said member secured to the driving shaft and a part connected to the outermost of said sleeves, plates mounted upon the two innermost sleeves, two other plates parallel to the plates on said sleeves, one of said last plates being fixed on said driven shaft, a plate between said last named plates connected to said member mounted on the driving shaft for rotation therewith, a plate between the plate mounted on the innermost sleeve and one of said last plates connected to the plate mounted on the intermediate sleeve for rotation therewith, and clutch portions between said last four plates and the plate mounted on the inner sleeve, automatic means controlled by the speed of the driving shaft and the load on the driven shaft to control the clutches thus formed, said means including centrifugal masses adapted to cause engagement of said clutches when a certain speed is reached, and means connecting said clutches, said clutch-connecting means transmitting the load on the driven shaft to the various clutches, said clutch-connecting means including members movable upon variations in the load on the driven shaft for preventing engagement of one of the clutches as long as the load remains above a predetermined value.

CHARLES EDOUARD HENRIOD.